US010880217B2

(12) United States Patent
Mallick et al.

(10) Patent No.: US 10,880,217 B2
(45) Date of Patent: Dec. 29, 2020

(54) HOST DEVICE WITH MULTI-PATH LAYER CONFIGURED FOR DETECTION AND RESOLUTION OF OVERSUBSCRIPTION CONDITIONS

(71) Applicant: EMC IP Holding Company LLC, Hopkinton, MA (US)

(72) Inventors: Sanjib Mallick, Bangalore (IN); Vinay G. Rao, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 16/231,685

(22) Filed: Dec. 24, 2018

(65) Prior Publication Data

US 2020/0204495 A1 Jun. 25, 2020

(51) Int. Cl.
*H04L 12/801* (2013.01)
*G06F 3/06* (2006.01)
(Continued)

(52) U.S. Cl.
CPC .............. *H04L 47/12* (2013.01); *G06F 3/061* (2013.01); *G06F 3/067* (2013.01); *G06F 3/0632* (2013.01);
(Continued)

(58) Field of Classification Search
None
See application file for complete search history.

(56) References Cited

U.S. PATENT DOCUMENTS 6,567,397 B1 5/2003 Campana et al.
6,687,746 B1 2/2004 Shuster et al.
(Continued)

FOREIGN PATENT DOCUMENTS

CN 103677927 B 2/2017
EP 1117028 A2 7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Scott B Christensen
(74) *Attorney, Agent, or Firm* — Ryan, Mason & Lewis, LLP (57) ABSTRACT

An apparatus comprises a host device configured to communicate over a network with a storage system comprising a plurality of storage devices. The host device comprises a set of input-output queues and a multi-path input-output driver configured to select input-output operations from the set of input-output queues for delivery to the storage system over the network. The multi-path input-output driver is further configured to maintain payload size counters to track outstanding command payload for respective ones of a plurality of paths from the host device to the storage system, to detect an oversubscription condition relating to at least one of the paths based at least in part on values of one or more of the payload size counters, and to initiate one or more automated actions responsive to the detected oversubscription condition. For example, automated deployment of one or more additional paths associated with respective spare communication links between the host device and the storage system may be initiated.

20 Claims, 2 Drawing Sheets

(51) Int. Cl.
*H04L 12/707* (2013.01)
*H04L 12/931* (2013.01)
*H04L 12/861* (2013.01)

(52) U.S. Cl.
CPC ............ *G06F 3/0659* (2013.01); *H04L 45/24* (2013.01); *H04L 49/356* (2013.01); *H04L 49/501* (2013.01); *H04L 49/505* (2013.01); *H04L 49/9084* (2013.01)

(56) References Cited

U.S. PATENT DOCUMENTS

| | | | |
|---|---|---|---|
| 6,697,875 B1 | 2/2004 | Wilson | |
| 6,947,382 B1* | 9/2005 | Bianchini, Jr. | H04L 12/5601 370/232 |
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,215,174 B2* | 12/2015 | Kwan | H04L 47/26 |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2005/0071528 A1* | 3/2005 | Utley | H04L 47/10 710/52 |
| 2005/0213507 A1* | 9/2005 | Banerjee | H04L 43/0841 370/241 |
| 2005/0281279 A1* | 12/2005 | Dennison | H04L 47/50 370/412 |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0069138 A1* | 3/2008 | Acharya | H04L 47/522 370/468 |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2009/0296593 A1* | 12/2009 | Prescott | H04L 43/00 370/252 |
| 2010/0157803 A1* | 6/2010 | Rivers | H04L 47/26 370/235 |
| 2010/0254409 A1* | 10/2010 | Lu | H04L 45/245 370/477 |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0318246 A1* | 11/2013 | Kuriakose | H04L 29/08576 709/227 |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0150421 A1* | 5/2016 | Li | H04L 41/0803 370/235 |
| 2016/0335003 A1 | 11/2016 | Ahmed et al. | |
| 2017/0235503 A1* | 8/2017 | Karr | G06F 13/1642 711/114 |
| 2017/0235507 A1 | 8/2017 | Sinha et al. | |
| 2018/0189635 A1 | 7/2018 | Olarig et al. | |
| 2018/0203723 A1* | 7/2018 | Krueger | G06F 9/467 |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al., filed Dec. 21, 2017 and entitled "Storage System with Input-Output Performance Control Utilizing Application Process Detection."

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al., filed Nov. 27, 2019, and entitled "Automated Seamless Migration of Logical Storage Devices."

(56) References Cited

OTHER PUBLICATIONS

U.S. Appl. No. 16/710,828 filed in the name of Amit Pundalik Anchi et al., filed Dec. 11, 2019, and entitled "Automated Seamless Migration with Signature Issue Resolution."

\* cited by examiner

HOST DEVICE WITH MULTI-PATH LAYER CONFIGURED FOR DETECTION AND RESOLUTION OF OVERSUBSCRIPTION CONDITIONS

FIELD

The field relates generally to information processing systems, and more particularly to storage in information processing systems.

BACKGROUND

Storage arrays and other types of storage systems are often shared by multiple host devices over a network. However, problems can arise in such arrangements when paths from one or more of the host devices to the storage system experience performance degradations. For example, such degradations can arise when communication links connecting a host device to the storage system are oversubscribed at the host device. Conventional approaches fail to adequately address oversubscription and as a result the performance of the storage system can be adversely impacted. The performance degradations are often manifested in the form of poor response times that can appear to indicate a problem in the storage system but are actually due to oversubscription issues in the host device. It is therefore particularly difficult in many such cases for a host administrator to distinguish between a host device oversubscription issue and a storage system issue. As a result, much time can be wasted under current practice in troubleshooting the storage system responsive to an apparent response time degradation when the actual problem is oversubscription of paths from the host device to the storage system.

SUMMARY

Illustrative embodiments configure a multi-path layer of one or more host devices to include functionality for oversubscription detection and resolution in conjunction with communication with a storage array or other type of storage system via a storage area network (SAN) or other type of network. The multi-path layer illustratively comprises at least one multi-path input-output (MPIO) driver configured to process input-output (IO) operations of at least one host device. The multi-path layer in such arrangements can be configured to dynamically monitor payload sizes of the IO operations selected for delivery over respective paths between a host device and the storage system in a manner that allows oversubscription conditions to be accurately and efficiently detected, while possibly also avoiding altogether one or more additional oversubscription conditions that might otherwise have arisen absent the detection and automated actions triggered by the detection. Moreover, illustrative embodiments can directly detect and report oversubscription issues, thereby avoiding any wasted time that might otherwise have been spent in troubleshooting the storage system.

In an illustrative embodiment, an apparatus comprises a host device configured to communicate over a network with a storage system comprising a plurality of storage devices. The host device includes a set of IO queues and an MPIO driver configured to select IO operations from the set of IO queues for delivery to the storage system over the network. The MPIO driver is further configured to maintain payload size counters to track outstanding command payload for respective ones of a plurality of paths from the host device to the storage system, to detect an oversubscription condition relating to at least one of the paths based at least in part on values of one or more of the payload size counters, and to initiate one or more automated actions responsive to the detected oversubscription condition.

The one or more automated actions are illustratively configured to resolve the detected oversubscription condition, for example, by altering a scheduling algorithm, load balancing algorithm or other type of algorithm utilized in selecting IO operations for particular paths. Such automated actions can also advantageously permit the avoidance of additional oversubscription conditions that might otherwise have arisen.

The paths from the host device to the storage system for which oversubscription conditions are detected in some embodiments comprise respective SAN paths, although other types of network paths can be used in other embodiments.

As a more particular example, the paths illustratively comprise paths associated with respective initiator-target pairs, with each of the initiators comprising a corresponding host bus adaptor (HBA) of the host device and each of the targets comprising a corresponding port of at least one storage array of the storage system.

Such paths in some embodiments are associated with respective communication links between the host device and the storage system with each such communication link having a negotiated link speed.

In some embodiments, the MPIO driver maintains payload size counters to track outstanding command payload for respective ones of the plurality of paths by incrementing the payload size counter for a given one of the paths in conjunction with initiation of the delivery of one or more of the IO operations to the storage system over the given path, and decrementing the payload size counter in conjunction with completion of the one or more IO operations delivered to the storage system over the given path. Incrementing the payload size counter for the given one of the paths illustratively comprises increasing a current value of the payload size counter by an amount corresponding to a total payload size of one or more outstanding commands associated with the one or more IO operations. Similarly, decrementing the payload size counter for the given one of the paths illustratively comprises decreasing the current value of the payload size counter by an amount corresponding to a total payload size of one or more completed commands associated with the one or more IO operations.

The payload size counter in such illustrative embodiments is therefore configured to track outstanding command payload for the given path. The payload size counter is incremented for each of the one or more outstanding commands responsive to issuance of that command, and decremented for each of the one or more completed commands responsive to completion of that command. Other types and arrangements of payload size counters can be used to track outstanding command payload for respective paths from a host device to a storage system in other embodiments. Also, different incrementing and decrementing arrangements can be used in maintaining such payload size counters.

The MPIO driver in some embodiments detects an oversubscription condition relating to at least one of the paths based at least in part on values of one or more of the payload size counters by determining a maximum payload size for a given one of the paths, and detecting the oversubscription condition based at least in part on the value of the payload size counter for the given path reaching a specified level relative to the maximum payload size for the given path. The specified level relative to the maximum payload size for the given path illustratively comprises a specified percentage of the maximum payload size for the given path.

Detecting the oversubscription condition based at least in part on the value of the payload size counter for the given path reaching a specified level relative to the maximum payload size for the given path can more particularly comprise accumulating multiple instances of the value of the payload size counter for the given path reaching a specified level relative to the maximum payload size for the given path over a designated period of time, and detecting the oversubscription condition responsive to the accumulated multiple instances exceeding a specified threshold number of instances.

The one or more automated actions initiated by the MPIO driver in some embodiments comprise automated deployment of one or more additional paths associated with respective spare communication links between the host device and the storage system.

Another example of an automated action that may be initiated by the MPIO driver responsive to detection of the oversubscription condition comprises generation of an oversubscription notification for delivery to a host administrator. The oversubscription notification generated for delivery to the host administrator illustratively comprises an indication of an amount of additional link bandwidth needed for one or more of the paths in order to alleviate the detected oversubscription condition relating to the one or more paths.

As a further example, an automated action initiated by the MPIO driver responsive to detection of the oversubscription condition can comprise generation of an oversubscription notification for delivery to the storage system. The oversubscription notification generated for delivery to the storage system illustratively comprises a vendor unique command in an otherwise standardized command format.

As yet another example, an automated action initiated by the MPIO driver responsive to detection of the oversubscription condition comprises initiating an adjustment to a scheduling algorithm, load balancing algorithm or other type of algorithm utilized in selecting the IO operations from the set of IO queues for delivery to the storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
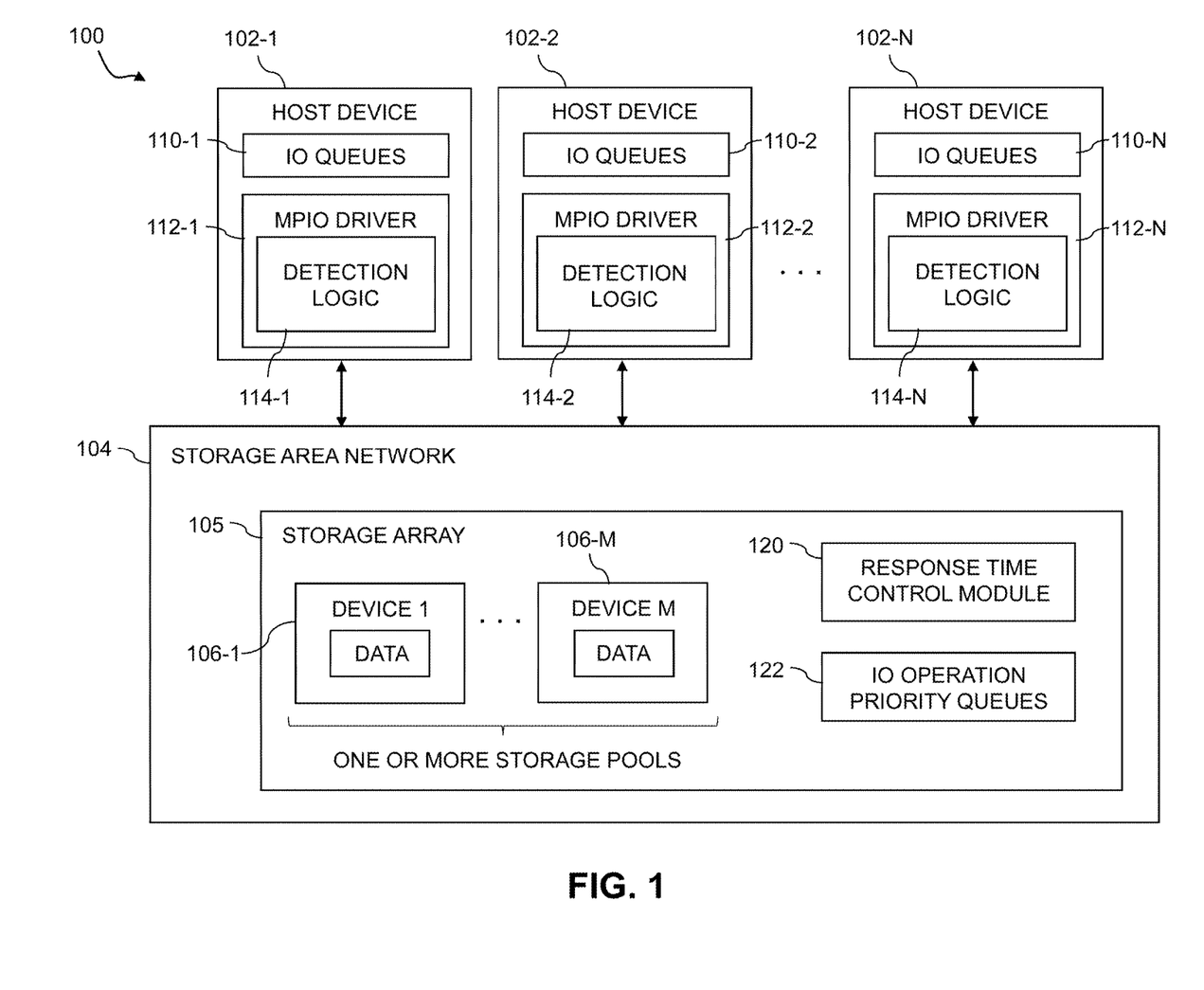
FIG. 1 is a block diagram of an information processing system configured with functionality for detection and resolution of oversubscription conditions utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for detection and resolution of oversubscription conditions using respective instances of detection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to detect and resolve oversubscription conditions. Other types of MPIO drivers from other driver vendors may be suitably modified to incorporate functionality for detection and resolution of oversubscription conditions as disclosed herein.

The MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO driver 112-1 is further configured to maintain payload size counters to track outstanding command payload for respective ones of a plurality of paths from the host device 102-1 to the storage array 105. The MPIO driver 112-1 detects an oversubscription condition relating to at least one of the paths based at least in part on values of one or more of the payload size counters, and initiates one or more automated actions responsive to the detected oversubscription condition.

A more detailed example of an arrangement of this type is described below in conjunction with the embodiment of FIG. 2.

The term "payload size counter" as used herein is intended to be broadly construed, so as to encompass, for example, any updatable data structure or other value-storing mechanism implemented in the host device 102-1 that can, through incrementing and decrementing operations applied to that mechanism, maintain information indicating an amount of payload associated with in-process commands issued on a corresponding path. A wide variety of different payload size counter types can therefore be used. The amount of payload associated with in-process commands issued on a particular path is an example of what is also referred to herein as "outstanding command payload" for that path. An in-process command is illustratively a command that has been sent by the host device 102-1 to the storage array 105 but has not yet completed from the viewpoint of the host device 102-1. A given payload size counter can be configured, for example, to count 512-byte SCSI blocks or other types of blocks associated with in-process commands of its corresponding path.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. As a more specific illustration, in the case of Fibre Channel the achievable link speed may be about 90-95% of the negotiated link speed. A link with a negotiated link speed of 100 MByte/sec may therefore have an actual throughput of only 90 Mbyte/sec. This difference between achievable and negotiated link speeds can lead to oversubscription conditions that might not be apparent to a host administrator.

A given "oversubscription condition" as that term is broadly used herein is intended to encompass a situation in which, for example, an HBA has outstanding commands of one or more IO operations that have been sent to the storage array 105 over a given link but for which the commands have an aggregate payload that cannot be processed through the link in a reasonable period of time. These and other situations in which commands are being sent to the storage array 105 without sufficient link bandwidth to accommodate the associated payload are considered examples of oversubscription conditions. Such oversubscription conditions can have significant negative consequences, including an inability to send or receive desired payload, storage array response time spikes due to command completion delays, and substantial degradations in application performance.

The above-noted payload size counters utilized in detection of oversubscription conditions may be internal to the MPIO driver 112-1. For example, such counters can be implemented in a kernel-space portion of the MPIO driver 112-1. Alternatively, such counters can be implemented externally to the MPIO driver 112-1 in another part of the host device 102-1. For example, in some embodiments, the counters can be implemented in a designated portion of a memory of the host device 102-1. Other designated portions of the host device 102-1 are utilized to implement the IO queues 110-1.

Various scheduling algorithms, load balancing algorithms and/or other types of algorithms can be utilized by the MPIO driver 112-1 in selecting IO operations from the IO queues 110-1 for delivery to the storage array 105 over the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

The MPIO driver 112-1 in maintaining the payload size counters to track outstanding command payload for respective ones of the plurality of paths is illustratively configured to increment the payload size counter for a given one of the paths in conjunction with initiation of the delivery of one or more of the IO operations to the storage array 105 over the given path, and to decrement the payload size counter in conjunction with completion of the one or more IO operations delivered to the storage array 105 over the given path. Completion of a given IO operation is assumed to occur when each command that is part of that operation is complete from the viewpoint of the host device 102-1.

As a more particular example, incrementing the payload size counter for the given one of the paths illustratively comprises increasing a current value of the payload size counter by an amount corresponding to a total payload size of one or more outstanding commands associated with one or more IO operations, and decrementing the payload size counter for the given one of the paths illustratively comprises decreasing the current value of the payload size counter by an amount corresponding to a total payload size of one or more completed commands associated with the one or more IO operations.

It is assumed that the payload size counter is incremented for each of the one or more outstanding commands responsive to issuance of that command, and decremented for each of the one or more completed commands responsive to completion of that command, although other incrementing and decrementing arrangements are possible.

In some embodiments, the MPIO driver 112-1 is configured to detect an oversubscription condition relating to at least one of the paths based at least in part on values of one or more of the payload size counters by determining a maximum payload size for a given one of the paths, and detecting the oversubscription condition based at least in part on the value of the payload size counter for the given path reaching a specified level relative to the maximum payload size for the given path. For example, the specified level relative to the maximum payload size for the given path can comprise a specified percentage of the maximum payload size for the given path, such as 90% of the maximum payload size. Other values and relative level indicators can be used in other embodiments.

The MPIO driver 112-1 may be configured to require occurrence of a threshold number of accumulated instances of the payload size counter for a given path reaching the specified level relative to the maximum payload size for the given path, before triggering detection of an oversubscription condition. For example, in an arrangement of this type, the MPIO driver 112-1 is illustratively configured to accumulate multiple instances of the value of the payload size counter for the given path reaching a specified level relative to the maximum payload size for the given path over a designated period of time, and to detect the oversubscription condition responsive to the accumulated multiple instances exceeding a specified threshold number of instances.

As noted above, the MPIO driver 112-1 initiates one or more automated actions responsive to the detected oversubscription condition. Such automated actions can also be performed at least in part by the MPIO driver 112-1, rather than just initiated by the MPIO driver 112-1, but can additionally or alternatively be performed at least in part by other components of the host device 102-1 or the system 100.

The one or more automated actions in some cases are configured to provide what is also referred to herein as "resolution" of a detected oversubscription condition. The resolution of a detected oversubscription condition as that term is broadly used is intended to encompass one or more actions that at least partially alleviate the detected oversubscription condition.

For example, a given automated action initiated by the MPIO driver 112-1 responsive to a detected oversubscription condition illustratively comprises initiating automated deployment of one or more additional paths associated with respective spare communication links between the host device 102-1 and the storage array 105.

As another example, a given automated action initiated by the MPIO driver 112-1 responsive to the detected oversubscription condition comprises initiating generation of an oversubscription notification for delivery to a host administrator. The oversubscription notification for delivery to the host administrator comprises an indication of an amount of additional link bandwidth needed for one or more of the paths in order to alleviate the detected oversubscription condition. The host device 102-1 can then be reconfigured to provide the needed additional link bandwidth, thereby resolving the detected oversubscription condition, as well as helping to avoid future oversubscription conditions that might have otherwise occurred without the additional link bandwidth.

Additionally or alternatively, an automated action initiated by the MPIO driver 112-1 responsive to the detected oversubscription condition can comprise initiating generation of an oversubscription notification for delivery to the storage array 105. Such an oversubscription notification for delivery to the storage array 105 illustratively comprises a "vendor unique command" or VU command in an otherwise standardized command format, such as a SCSI command format.

A further example of an automated action that may be initiated by the MPIO driver 112-1 comprises initiating an adjustment to an algorithm utilized in selecting the IO operations from the set of IO queues 110-1 for delivery to the storage array 105. Such an algorithm illustratively comprises a scheduling algorithm, load balancing algorithm or other type of algorithm utilized in selecting IO operations for delivery over particular paths. A given such algorithm can incorporate both scheduling and load balancing functionality.

As indicated previously, absent use of the oversubscription detection and resolution techniques in a multi-path layer as disclosed herein, it can be difficult for a host administrator to distinguish between a host device oversubscription issue and a storage system issue. As a result, much time can be wasted under current practice in troubleshooting the storage system responsive to an apparent response time degradation when the actual problem is oversubscription of paths from the host device to the storage system. Unaddressed oversubscription conditions can have significant negative consequences, as noted above, including an inability to send or receive desired payload, storage array response time spikes due to command completion delays, and substantial degradations in application performance.

Such drawbacks are advantageously overcome in illustrative embodiments herein by utilization of a multi-path layer comprising one or more of the MPIO drivers 112 to detect and resolve oversubscription conditions as described above.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As indicated previously, the host device 102-1 may be configured to generate a notification for delivery to a host administrator responsive to detection of an oversubscription condition for the given path. Additionally or alternatively, the host device 102-1 may be configured to generate a notification for delivery to the storage array 105 responsive to detection of the oversubscription condition for the given path. Other types of reporting arrangements are utilized in other embodiments.

The above-described functions associated with oversubscription detection and resolution functionality of the MPIO driver 112-1 are carried out at least in part under the control of its detection logic 114-1. For example, the detection logic 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to select IO operations from its corresponding one of the sets of IO queues 110 for delivery to the storage array 105 over the SAN 104, and to perform the disclosed functionality for detection and resolution of oversubscription conditions. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support detection and resolution of oversubscription conditions.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, now U.S. Pat. No. 10,474,367, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of detection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
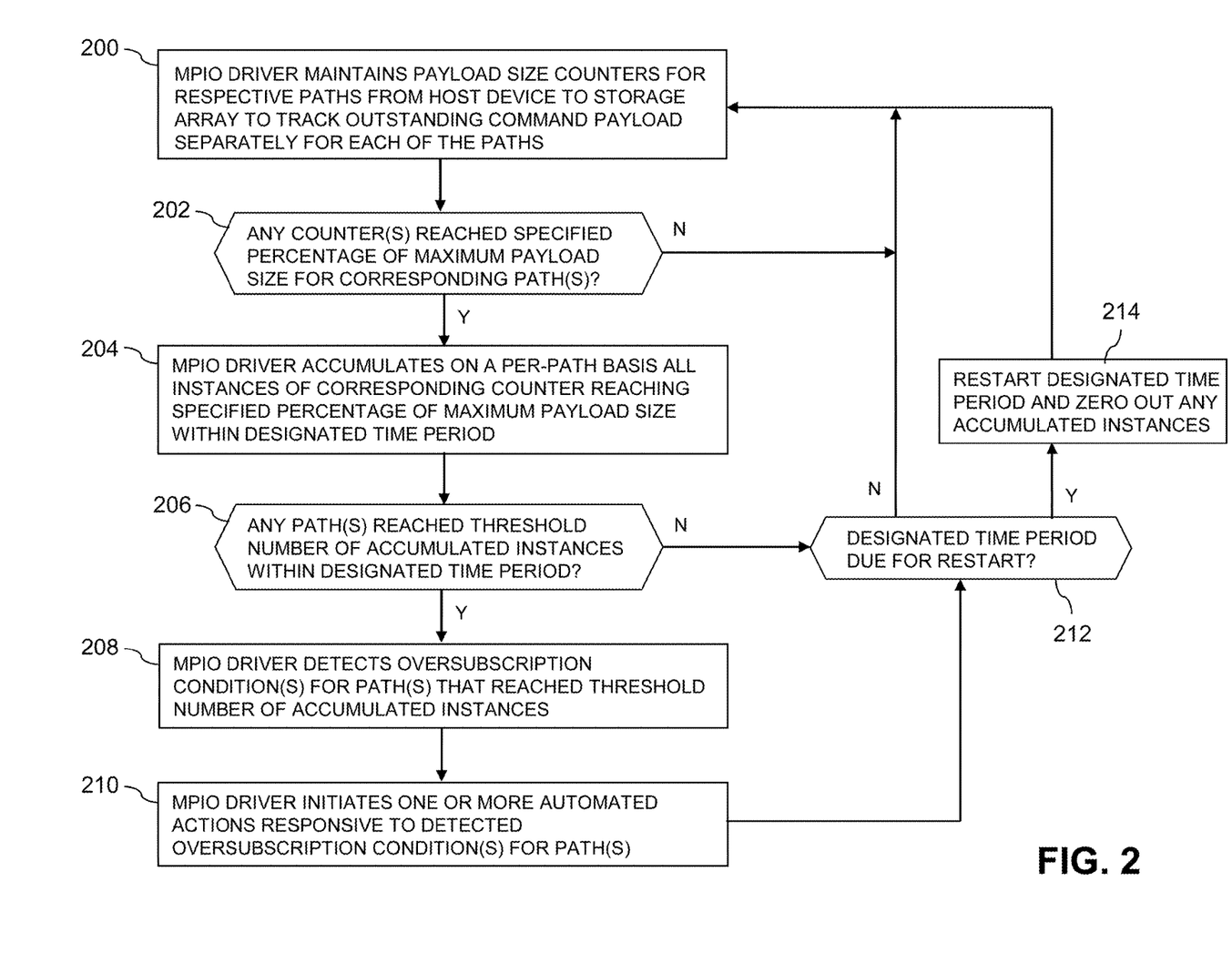
FIG. 2 is a flow diagram of a process for detection and resolution of oversubscription conditions utilizing a multi-path layer of a host device in an illustrative embodiment.

The steps of the FIG. 2 process are illustratively performed primarily by or under the control of an MPIO driver of a given host device. For example, the process may be carried out under the control of software, firmware and/or hardware of an instance of scheduling logic deployed within the MPIO driver. Other arrangements of system components can be configured to perform at least portions of one or more of the steps in other embodiments. This embodiment further assumes that the commands utilized by the host devices in generating IO operations such as read and write operations directed to the storage array comprise SCSI commands, although other types of commands can be used.

In step 200, the MPIO driver in the host device maintains payload size counters for respective paths from the host device to the storage array in order to track outstanding command payload separately for each of the paths.

At least some of the paths from the host device to the storage array may be determined using an initial path discovery scan performed in conjunction with booting of the host device. It is assumed for the description of this embodiment that the host device has discovered a plurality of paths to the storage array, and further that at least one storage device of the storage array is visible to the host device on each of the paths.

The path discovery scan can be repeated responsive to one or more detected path changes or under other specified conditions. For example, a storage administrator or other user may perform zoning and/or masking changes to the storage array that result in at least one new path becoming available to the host device. Accordingly, the set of multiple paths over which the predetermined command is periodically sent by the host device to the storage array can change over time.

In step 202, a determination is made by the MPIO driver as to whether or not any of the payload size counters have reached a specified percentage of maximum payload size for their respective corresponding paths. If there is at least one payload size counter that has reached the specified percentage of the maximum payload size for the corresponding path, the process moves to step 204, and otherwise returns to step 200 to continue maintaining the payload size counters for the respective paths.

In step 206, the MPIO driver accumulates on a per-path basis all instances of the corresponding counter reaching specified percentage of maximum payload size within designated time period.

The MPIO driver in the present embodiment therefore does not report or take other similar actions for each and every instance of the payload size counter for a given path reaching the specified percentage of the maximum payload size. This avoids the generation of an excessive number of notifications within the system. Instead, the MPIO driver accumulates such instances and takes action only if, for example, there are at least X instances within Y seconds for a given one of the paths. Suitable values for X and Y in some embodiments are 100 instances in 10 seconds, although other values can be used.

In step 206, a determination is made by the MPIO driver as to whether or not there are one or more paths that have reached a threshold number of accumulated instances within a designated time period. The value given for variable X above is an example of the threshold number of instances, and the value given for variable Y above is an example of the designated time period. If there is at least one path that has reached the threshold number of accumulated instances within the designated time period, the process moves to step 208, and otherwise moves to step 212 as indicated.

In step 208, the MPIO driver detects an oversubscription condition for each path or path that has reached the threshold number of accumulated instances within the designated time period.

In step 210, the MPIO driver initiates one or more automated actions responsive to the one or more detected oversubscription conditions for the one or more paths. Examples of various automated actions that may be initiated by the MPIO driver are described elsewhere herein. The process then moves to step 212.

In step 212, a determination is made by the MPIO driver as to whether or not the designated time period is due for restart. If the designated time period is due for restart, the process moves to step 214, and otherwise returns to step 200 to continue maintaining the payload size counters for the respective paths.

In step 214, the designated time period is restarted and any accumulated instances are zeroed out for each of the paths. The process then returns to step 200 to continue maintaining the payload size counters for the respective paths.

Multiple additional instances of the FIG. 2 process may be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and oversubscription detection and resolution functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different oversubscription detection and resolution arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for oversubscription detection and resolution in a multi-path layer will now be described. It is assumed in this embodiment that the MPIO driver of a given host device provides oversubscription detection and resolution functionality, under the control of a corresponding instance of detection logic implemented in the MPIO driver.

In this example, the MPIO driver implements the following process within the given host device:

1. The MPIO driver initializes a payload_sent counter for each of a plurality of paths associated with respective links between the host device and the storage array.

2. The MPIO driver determines a negotiated link speed for each link and sets a maximum payload size for each link based on an achievable link speed illustratively given by 90% of its negotiated link speed.

3. Each time a new command is sent to the storage array over one of the paths, the MPIO driver increments the payload_sent counter for that path by an amount corresponding to the size of the payload associated with the command.

4. Each time a sent command completes for one of the paths, the MPIO driver decrements the payload_sent counter for that path by an amount corresponding to the size of the payload associated with the command. Such decrementing of the payload_sent counter can alternatively occur in conjunction with payload transfer.

5. Each time a payload_sent counter for any path meets or exceeds a specified percentage of the maximum payload size within a designated period, a corresponding set of accumulated instances is incremented for that path. The designated percentage can be 100% of the maximum payload size, or a lesser percentage.

6. If any of the payload_sent counters meets or exceeds the specified percentage of its maximum payload size at least X times in Y seconds, the MPIO driver issues a notification of a corresponding oversubscription condition to the host administrator, and possibly initiates one or more other automated actions. The notification can include an indication of the additional link bandwidth that would be needed to resolve the oversubscription condition (e.g., a difference between a current value of the payload_sent counter and the maximum link capacity for the path), and possibly other information. Additionally or alternatively, the additional link bandwidth can be automatically deployed, possibly using one or more spare communication links that have been preconfigured for that purpose. The MPIO driver also illustratively sends a notification to the storage array of the detected oversubscription condition, such that a storage administrator can understand that the oversubscription condition may have been the cause of certain delayed command response times.

7. The process continues with the payload_sent counters being maintained and monitored for the respective paths, and additional oversubscription conditions being detected during the monitoring. Maintaining the payload_sent counters can include zeroing out any accumulated instances of those counters reaching the specified percentage of the maximum payload size, each time the designated period is restarted.

As mentioned previously, different instances of the above-described process can be performed by different MPIO drivers in different host devices.

The particular oversubscription detection and resolution arrangements described above are presented by way of illustrative example only. Numerous alternative arrangements of these and other features can be used in implementing the FIG. 2 process and other illustrative embodiments. For example, some embodiments can eliminate the accumulation of instances and test for reaching a threshold number of instances in steps 204 and 206, and instead simply indicate a detected oversubscription condition any time that one of the payload size counters reaches a specified percentage of its maximum payload size.

The illustrative embodiments disclosed herein can provide a number of significant advantages relative to conventional arrangements. For example, some embodiments configure a multi-path layer of one or more host devices to include functionality for oversubscription detection and resolution.

The multi-path layer in such arrangements can be configured to dynamically monitor payload sizes of the IO operations selected for delivery over respective paths between a host device and the storage system in a manner that allows oversubscription conditions to be accurately and efficiently detected, while possibly also avoiding altogether one or more additional oversubscription conditions that might otherwise have arisen absent the detection and automated actions triggered by the detection.

For example, the multi-path layer in such arrangements can be configured to separately track the outstanding command payload for each of the paths in order to detect existing or potential oversubscription conditions as well as to avoid other oversubscription conditions.

Moreover, illustrative embodiments can directly detect and report oversubscription issues, thereby avoiding any wasted time that might otherwise have been spent in troubleshooting the storage system. Such embodiments allow a host administrator to more efficiently address any oversubscription conditions that arise. Oversubscription condition notifications can also assist a storage administrator in understanding delayed command response times.

These and other arrangements are advantageously configured to provide efficient detection and resolution of oversubscription conditions even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of detection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, detection logic and additional or alternative components. Also, the particular configurations of system and device elements and associated processing operations illustratively shown in the drawings can be varied in other embodiments. For example, a wide variety of different MPIO driver configurations and associated oversubscription detection and resolution arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   a host device configured to communicate over a network with a storage system comprising a plurality of storage devices;
   the host device comprising:
   a set of input-output queues, each input-output queue storing input-output operations generated by the host device and directed to one or more of the plurality of storage devices, different ones of the input-output operations having respective different command payload sizes; and
   a multi-path input-output driver configured to select input-output operations from the set of input-output queues for delivery to the storage system over the network;
   wherein the multi-path input-output driver is further configured:
   to maintain payload size counters to track outstanding command payload for respective ones of a plurality of paths from the host device to the storage system, with separate ones of the payload size counters being maintained for different ones of the plurality of paths, the outstanding command payload for a given one of the paths comprising a cumulative command payload size for multiple ones of the input-output operations sent over the given path;
   responsive to monitoring of respective ones of the payload size counters, to detect an oversubscription condition relating to at least one of the paths based at least in part on values of one or more of the payload size counters and corresponding maximum payload sizes for respective ones of the paths, the oversubscription condition being indicative of an inability of at least one path to accommodate a corresponding payload amount within one or more specified performance constraints; and
   to initiate one or more automated actions responsive to the detected oversubscription condition;
   wherein detecting an oversubscription condition relating to at least one of the paths based at least in part on values of one or more of the payload size counters comprises:
   accumulating multiple instances of the value of the payload size counter for a given one of the paths reaching a specified level relative to a maximum payload size for the given path over a designated period of time; and
   detecting the oversubscription condition responsive to the accumulated multiple instances exceeding a specified threshold number of instances.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein maintaining payload size counters for respective ones of the plurality of paths comprises:
   incrementing the payload size counter for a given one of the paths in conjunction with initiation of the delivery of one or more of the input-output operations to the storage system over the given path; and
   decrementing the payload size counter in conjunction with completion of the one or more input-output operations delivered to the storage system over the given path.

4. The apparatus of claim 3 wherein incrementing the payload size counter for the given one of the paths comprises increasing a current value of the payload size counter by an amount corresponding to a total payload size of one or more outstanding commands associated with the one or more input-output operations, and wherein decrementing the payload size counter for the given one of the paths comprises decreasing the current value of the payload size counter by an amount corresponding to a total payload size of one or more completed commands associated with the one or more input-output operations, wherein the payload size counter is incremented for each of the one or more outstanding commands responsive to issuance of that command, and decremented for each of the one or more completed commands responsive to completion of that command.

5. The apparatus of claim 1 wherein the plurality of paths comprise paths associated with respective initiator-target pairs wherein each of the initiators comprises a corresponding host bus adaptor of the host device and each of the targets comprises a corresponding port of at least one storage array of the storage system.

6. The apparatus of claim 1 wherein the paths are associated with respective communication links between the host device and the storage system with each such communication link having a negotiated link speed.

7. The apparatus of claim 1 wherein the specified level relative to the maximum payload size for the given path comprises a specified percentage of the maximum payload size for the given path.

8. The apparatus of claim 1 wherein initiating one or more automated actions responsive to the detected oversubscription condition comprises initiating automated deployment of one or more additional paths associated with respective spare communication links between the host device and the storage system.

9. The apparatus of claim 1 wherein initiating one or more automated actions responsive to the detected oversubscription condition comprises initiating generation of an oversubscription notification for delivery to a host administrator responsive to detection of the oversubscription condition.

10. The apparatus of claim 9 wherein the oversubscription notification for delivery to the host administrator comprises an indication of an amount of additional link bandwidth needed for one or more of the paths in order to alleviate the detected oversubscription condition relating to the one or more paths.

11. The apparatus of claim 1 wherein initiating one or more automated actions responsive to the detected oversubscription condition comprises initiating generation of an oversubscription notification for delivery to the storage system responsive to detection of the oversubscription condition, and further wherein the oversubscription notification for delivery to the storage system comprises a vendor unique command in an otherwise standardized command format.

12. The apparatus of claim 1 wherein initiating one or more automated actions responsive to the detected oversubscription condition comprises initiating an adjustment to an algorithm utilized in selecting the input-output operations from the set of input-output queues for delivery to the storage system.

13. A method comprising:
configuring a multi-path input-output driver of a host device to communicate with a storage system over a network, the host device generating input-output operations directed to one or more of a plurality of storage devices of the storage system, different ones of the input-output operations having respective different command payload sizes;
the multi-path input-output driver:
maintaining payload size counters to track outstanding command payload for respective ones of a plurality of paths from the host device to the storage system, with separate ones of the payload size counters being maintained for different ones of the plurality of paths, the outstanding command payload for a given one of the paths comprising a cumulative command payload size for multiple ones of the input-output operations sent over the given path;
responsive to monitoring of respective ones of the payload size counters, detecting an oversubscription condition relating to at least one of the paths based at least in part on values of one or more of the payload size counters and corresponding maximum payload sizes for respective ones of the paths, the oversubscription condition being indicative of an inability of at least one path to accommodate a corresponding payload amount within one or more specified performance constraints; and
initiating one or more automated actions responsive to the detected oversubscription condition;
wherein detecting an oversubscription condition relating to at least one of the paths based at least in part on values of one or more of the payload size counters comprises:
accumulating multiple instances of the value of the payload size counter for a given one of the paths reaching a specified level relative to a maximum payload size for the given path over a designated period of time; and
detecting the oversubscription condition responsive to the accumulated multiple instances exceeding a specified threshold number of instances.

14. The method of claim 13 wherein maintaining payload size counters to track outstanding command payload for respective ones of the plurality of paths comprises:
incrementing the payload size counter for a given one of the paths in conjunction with initiation of the delivery of one or more of the input-output operations to the storage system over the given path; and
decrementing the payload size counter in conjunction with completion of the one or more input-output operations delivered to the storage system over the given path.

15. A computer program product comprising a non-transitory processor-readable storage medium having stored therein program code of one or more software programs, wherein the program code, when executed by a host device comprising a multi-path input-output driver, the host device being configured to communicate over a network with a storage system, the host device generating input-output operations directed to one or more of a plurality of storage devices of the storage system, different ones of the input-output operations having respective different command payload sizes, causes the multi-path input-output driver:
to maintain payload size counters to track outstanding command payload for respective ones of a plurality of paths from the host device to the storage system, with separate ones of the payload size counters being maintained for different ones of the plurality of paths, the outstanding command payload for a given one of the paths comprising a cumulative command payload size for multiple ones of the input-output operations sent over the given path;
responsive to monitoring of respective ones of the payload size counters, to detect an oversubscription condition relating to at least one of the paths based at least in part on values of one or more of the payload size counters and corresponding maximum payload sizes for respective ones of the paths, the oversubscription condition being indicative of an inability of at least one path to accommodate a corresponding payload amount within one or more specified performance constraints; and
to initiate one or more automated actions responsive to the detected oversubscription condition;
wherein detecting an oversubscription condition relating to at least one of the paths based at least in part on values of one or more of the payload size counters comprises:
accumulating multiple instances of the value of the payload size counter for a given one of the paths reaching a specified level relative to a maximum payload size for the given path over a designated period of time; and
detecting the oversubscription condition responsive to the accumulated multiple instances exceeding a specified threshold number of instances.

16. The computer program product of claim 15 wherein maintaining payload size counters to track outstanding command payload for respective ones of the plurality of paths comprises:

incrementing the payload size counter for a given one of the paths in conjunction with initiation of the delivery of one or more of the input-output operations to the storage system over the given path; and  decrementing the payload size counter in conjunction with completion of the one or more input-output operations delivered to the storage system over the given path.

17. The computer program product of claim 16 wherein incrementing the payload size counter for the given one of the paths comprises increasing a current value of the payload size counter by an amount corresponding to a total payload size of one or more outstanding commands associated with the one or more input-output operations, and wherein decrementing the payload size counter for the given one of the paths comprises decreasing the current value of the payload size counter by an amount corresponding to a total payload size of one or more completed commands associated with the one or more input-output operations, wherein the payload size counter is incremented for each of the one or more outstanding commands responsive to issuance of that command, and decremented for each of the one or more completed commands responsive to completion of that command.

18. The computer program product of claim 15 wherein the plurality of paths comprise paths associated with respective initiator-target pairs wherein each of the initiators comprises a corresponding host bus adaptor of the host device and each of the targets comprises a corresponding port of at least one storage array of the storage system.

19. The computer program product of claim 15 wherein the paths are associated with respective communication links between the host device and the storage system with each such communication link having a negotiated link speed.

20. The computer program product of claim 15 wherein the specified level relative to the maximum payload size for the given path comprises a specified percentage of the maximum payload size for the given path.

\* \* \* \* \*